United States Patent Office 2,816,115
Patented Dec. 10, 1957

2,816,115

PRODUCTION OF PHTHALOCYANINE COLORS IN PIGMENTARY STATE

Edward Tillson Howell, Avondale, Pa., assignor to E. I. du Pont de Nemours and Company, Wilmington, Del., a corporation of Delaware No Drawing. Application July 12, 1954,
Serial No. 442,905

6 Claims. (Cl. 260—314.5)

This invention relates to the production of phthalocyanine coloring matters in beta form and in the pigmentary state. By the latter quality I mean a state of fine subdivision and softness (i. e. ease of dispersion), which makes the product suitable directly for incorporation into printing pastes for textile or for wall paper, into paper pulp, into water paints or, after a suitable flushing procedure if need be, into paints, lacquers or printing inks.

As is well known, most phthalocyanine pigments directly as obtained in the various syntheses thereof are solids characterized by a hard crystalline structure which lacks pigmentary qualities. Even if ground to a particle size of a few microns, the product has little tinctorial strength. To achieve the pigmentary state, further special treatments are required.

It is also known that chlorine-free phthalocyanine compounds—for instance, copper phthalocyanine, nickel phthalocyanine or metal-free phthalocyanine—are capable of existing in two crystalline forms which are readily distinguished by their X-ray diffraction patterns, and which have been designated in the art as alpha and beta, respectively. Typical X-ray diffraction curves for the two modifications in the case of copper phthalocyanine are given in the drawing of Graham, U. S. P. 2,556,728.

The crude reaction products of the mentioned colors as obtained in the various syntheses thereof are generally in the beta form, but many of the subsequent treatments hitherto devised for converting these crudes to pigmentary state generally achieve also complete or partial conversion of the product to the alpha form. This is true, for instance, of the acid-pasting method, which customarily implies dissolution of the color in concentrated sulfuric acid followed by drowning in water, and of the dry salt-milling process (Lang and Detrick, U. S. P. 2,402,167).

The alpha form is somewhat redder in shade than the beta form. In addition, the alpha form tends to grow large crystals when incorporated into paints or lacquers which contain as part of their liquid vehicle aromatic hydrocarbons. For these reasons, the beta form is in many instances preferred in the trade.

In the mentioned Graham patent it is taught that when salt-milling is done in the presence of an aromatic hydrocarbon such as xylene, or of chlorinated hydrocarbon such as trichlorobenzene, the transformation of the product from beta to alpha is largely avoided.

Lane, U. S. P. 2,556,726, and Lane and Stratton, U. S. P. 2,556,727, achieve the same object by ball milling the color with relatively small balls (steel shot), in the presence of a relatively large quantity of an oxygenated organic liquid such as acetone or ethyl alcohol. Lane and Stratton, however, are emphatic on the point that replacement of the oxygenated organic liquid by water leads to failure, and that wet grinding of phthalocyanine with ceramic or metallic balls in water has proven incapable of reducing the particle size to anything below 2 microns. On the other hand, it has been generally recognized that for good pigmentary properties, phthalocyanine colors should be reduced to a size ranging from about 0.01 micron in largest dimension to a maximum of perhaps 0.2 micron.

Needless to say, the methods of Graham and Lane et al. constitute highly meritorious contributions toward the solution of the above perplexing problem. Applicant, however, has felt that further improvement in the process is desirable from the viewpoint of economy and safety of operation. For instance, if the desired effect could be achieved by grinding in an aqueous environment, the result would be not only a saving in the cost of the organic liquids required by the other processes, but also elimination of a fire hazard in operation.

Accordingly, it is an object of this invention to provide a simple and economical process for converting a crude phthalocyanine coloring matter in beta form to the pigmentary state without converting the coloring matter into the alpha form. Another object is to produce copper phthalocyanine, nickel phthalocyanine or metal-free phthalocyanine in pigmentary state and in essentially beta form by milling in an aqueous environment. Other objects and achievements of this invention, will become apparent as the description proceeds.

Now according to this invention, the above objects are achieved by milling the crude beta phthalocyanine coloring matter with a comminuted water-insoluble, solid grinding agent—for instance, a fine sand—and sufficient water to convert the mixture into a stirrable viscous mass, the milling being done in an apparatus which causes the mass to undergo internal shear rather than impact. A convenient illustration of such an apparatus is the disc mill described in U. S. P. 2,581,414. The merit of this particular apparatus is that it imparts high velocity differentials between adjacent particles in the viscous mass being milled. It seems that the objects of this invention are accomplished best under conditions of high-velocity, internal shear. Under such conditions, my invention achieves the additional and unforeseen advantage of completing the milling process in a few hours (say 5 to 10 hours) compared to the long grinding cycles (24 to 48 hours and even up to 110 hours) required by some of the milling processes of the prior art hereinabove referred to.

To facilitate internal shear, the proportion of solid ingredients and water in the mixture being milled is preferably such that the mass is a highly viscous fluid. Also, to produce such a viscous mass, it is obviously necessary that the crude pigment and the grinding agent themselves be initially subdivided to a state where they can be intimately stirred into water. Thus, the coloring matter should preferably be in a state of subdivision wherein not less than 90% of its weight consists of particles not over 100 microns in the largest dimension.

Such a state of initial subdivision is obtained directly in certain modes of synthesis of the color. It is obtained, for instance, in the modified urea process described in U. S. P. 2,214,477 (particularly Example 1) if the process is carried out in trichlorobenzene as solvent. In other cases, the above initial state of subdivision may be achieved by grinding the crude pigment in any convenient apparatus.

The sand or other grinding agent should also be in a fine state of division. If the particle size of the water-insoluble comminutor is larger than 100 mesh, excessive grinding time will be required. If the particle size is much coarser than 100 mesh, the process may actually become inoperative. Good results have been obtained with sands whose particles size was predominantly between 100 to 325 mesh (U. S. sieve series).

It is also advantageous to have a water-soluble dispersing agent in the mass being milled. Such an agent may be any convenient, anionic, water-soluble compound which has relatively strong dispersing powers. Convenient illustrations are the alkali-metal salts of formaldehyde-naphthalene-sulfonic acid condensation products; the alkali-metal salts of lignin-sulfonic acids, and the alkali-metal salts of hydrolyzed styrene-maleic-anhydride copolymers (U. S. P. 2,220,867).

The quantity of dispersing agent may vary from about 10 to 100 parts by weight for each 100 parts of pigment being milled. Ordinarily, 20 to 30 parts by weight will give satisfactory results as far as the process of grinding is concerned. But where it is desired to incorporate in the final product a relatively large quantity of dispersing agent (say, for the sake of rendering the product easily dispersible in water), the higher ratios of dispersing agent above indicated (say 70 to 100 parts per 100 parts of pigment) will be employed. The quantity of grinding agent is preferably not less than 2.5 parts by weight for each part of pigment. The quantity of water is best judged by the consistency of the mass produced, which obviously should be sufficiently fluid to permit efficient milling, without unduly thinning the mass. Customarily, some 20 to 30 parts of water per 100 parts of total solids will be employed initially, but additional quantities may be required from time to time as grinding proceeds.

Following grinding, the pigment may be separated from the grinding agent by any available physical means, for instance, by centrifuging, or by settling and decanting. For the latter mode of recovery, the mass is preferably diluted with additional water to facilitate settling. The pigment as a rule is in such a fine state of subdivision that it stays suspended in the liquid phase, while the sand settles out. Any quantities of the pigment adhering to the settled grinding agent may be recovered by washing the sandy mass over a filter. From the decanted aqueous suspension of the pigment (or from the wash liquors in the other case), concentrated aqueous pastes of the color may be prepared by flocculation (by adding an electrolyte) or by evaporation, and these evaporated pastes may be marketed as such or may be further evaporated to a dry powder.

The temperature of the mass being milled should preferably be controlled to avoid overheating. Temperatures in the range of 0° to 80° C. or higher, can be employed. From the viewpoint of power efficiency, however, a temperature range of 60° to 80° C. is recommended.

Without limiting my invention, the following examples are given to illustrate my preferred mode of operation. Parts mentioned are by weight.

*Example 1*

The apparatus recommended for this process is a double disc mill of the type described in U. S. P. 2,581,414. Single disc and triple disc mills of the same type may also be used. The disc-and-shaft assembly is rotated at high speed, say at a peripheral velocity of 2000 to 2500 feet per min. (For example, in a disc of 5½" diameter, this would correspond to about 1400 to 1700 R. P. M.)

The mill is charged with 675 parts of water, 125 parts of the sodium sulfonate of the polymeric condensate of naphthalene and formaldehyde ("Daxad 11"), and 417 parts of dry pulverized crude copper phthalocyanine in beta form, for instance, the product obtained in Example 1 of U. S. 2,214,477 but using trichlorobenzene as a diluent. When the mixture is smooth, 2080 parts of fine sand (95% finer than 100 mesh but not over 10% finer than 325 mesh) are added at about 40° C., and water in small increments is added, if needed, to keep the mass from getting too dry. The proper amount of water to be added is that which will make the mass sufficiently fluid to be workable while still retaining sufficient viscosity to provide for internal shear. If the mass is too dry, it will tend to "shelve" around the sides, or a jerky, uneven torque will set in. The milling is continued at about 40° C. until test samples of the mass, after dilution with water and centrifuging out the sand, show that the pigment particles have become submicroscopic at 450 magnification. Milling is then continued for another 1 to 3 hours; then the charge is diluted with 4000 parts water and the sand is allowed to settle to the bottom of the container. The supernatant color suspension is decanted off and filtered through a screen or cloth to remove traces of sand. The residual sand can be freed from color by transferring it to a vacuum filter and washing with water.

The resulting color suspension is concentrated to a paste by partial evaporation and is then diluted for use. It is useful for water dispersed applications of pigments such as textile printing, wall paper coloration, paper beater dyeing, etc. This process gives a bright greenish-blue shade of beta copper phthalocyanine in stronger tints than that usually obtained by the sulfuric acid pasting method when evaluated by the "Sho-Pal" starch printing test. The wall paper brush out test also establishes the superiority of pigment obtained by this process, since brighter, stronger shades are obtained. X-ray diffraction patterns of the color obtained by this process demonstrate that it is predominately in the beta form.

*Example 2*

85 parts of crude copper phthalocyanine press cake, 15 parts of "Daxad 11" (see Example 1), 25 parts of water and 250 parts of Alundum powder (Riegel, Industrial Chemistry, 4th edition, pages 298–299) are mixed together in a mill of the type mentioned in Example 1. The press cake is selected to contain 50 parts copper phthalocyanine in beta form and in an initial state of subdivision in which not less than 90% of the pigment, by weight, consists of particles less than 100 microns in largest dimension. The Alundum grade is selected to consist of particles ranging from −120 to +325 mesh. After adjusting the consistency of the mass to a viscous fluid by evaporating off some of the water by means of an air stream, grinding is continued until the pigment particles are submicroscopic and then for one hour longer. The charge is diluted with 500 parts of water and the "Alundum" is separated by sedimentation, giving a useful, dispersed pigment paste. Alternatively, the colloidal pigment suspension may be flocculated by the addition of 20 parts of sulfuric acid in 50 parts water, heating to 90° C., and treating with 25 parts of n-butanol followed by heating to reflux. The flocculated pigment is filtered and washed to give a pigment press cake.

The pigment thus obtained shows the shade of the beta form.

*Example 3*

A container as in Example 1 is charged with 130 parts water, 30 parts of "Daxad 11" and 100 parts of crude metal-free phthalocyanine in beta form, obtained according to Example 1 of U. S. P. 2,485,167. When the mixture has smoothed to a uniform mass, 500 parts of fine sand (as in Example 1) are added during a period of several minutes, adding water in increments, if needed, to control the consistency. The ideal state for such consistency is that at which the power input, as gaged by suitable meters, is 0.6–0.7 kw. for each square foot of disc area. The temperature is kept at 25–30° C. by means of a cooling bath. When the microscope shows that the color particles are submicron in size, milling is continued for one more hour and the charge is worked up as in Example 1, using 1000 parts of water. X-ray diffraction indicates that the product is predominately in the beta form.

*Example 4*

40 parts of water, 15 parts of "Daxad 11" and 50 parts of nickel phthalocyanine (crude crystals containing no detectable alpha phase by X-ray diffraction) are charged into a container as in Example 1, 250 parts of fine sand (as in Example 1) are added over a period of a few minutes, maintaining the temperature at 15–20° C., and milling is continued until the microscope no longer resolves the color particles at 450× magnification. The mass may be worked up as in Example 1 using 500 parts water. X-ray diffraction shows that the product is predominately in the beta form.

Example 5

100 parts of water, 40 parts of the sodium salt of a hydrolyzed styrene-maleic anhydride copolymer (25% solution in water; Example 2 of U. S. P. 2,220,867) and 100 parts of pulverized crude beta copper phthalocyanine are charged into a container as in Example 1, 500 parts of fine sand (as in Example 1) are added uniformly during a period of several minutes. The consistency is adjusted as in Examples 2 and 3 to give a viscous mass corresponding to a power input of 0.8 to 1.0 kw. per square foot disc area. The temperature is allowed to rise to 60–70° C., and milling continued for 1 hour after the color particles are mostly submicroscopic. This agent causes more foaming than agents of the "Daxad 11" class. After diluting with 1000 parts of water, the sand may be removed as in the above examples, and the same free colloidal suspension may be flocculated by running into a saturated solution of monosodium phosphate followed by boiling. The flocculated pigment is filtered off and washed until practically free from salts and dispersing agent. The resulting pigment press cake when flushed into litographic varnish on the ink mill affords a very jet masstone and a strong and bright extended shade compared to current beta standards.

Example 6

150 parts of water and 65 parts of "Daxad 11" (see Example 1) are charged into a disc mill of the type used in Example 1. 100 parts of crude copper phthalocyanine are then added to the mill, followed by 500 parts of fine sand. Milling is continued at 75° to 80° C., and water is added as necessary to maintain a consistency which will permit adequate mixing of the mill contents. When microscopic examination shows that the color particles are submicron in size, milling is continued for 1 to 3 hours, and the charge is worked up as in Example 1 to yield a pigment paste having the properties of the beta form.

If desired, the color suspension can be flocculated with acid and alcohol as in Example 2 to give a pigment press cake. Alternately, the color suspension can be dried to a powder.

It will be understood that the details of the above examples may be varied considerably, without departing from the spirit of this invention. For instance, in lieu of the disc mill specified, any apparatus producing contact of the viscous mass with a rapidly moving surface may be employed. For example, a rapidly moving, continuous belt within the pigment dispersion can be employed; or two concentric cylinders immersed in the dye dispersion can be used with one or both of the cylinders rotating on their vertical axis in the same or opposite directions, the grinding mass being fed into the clearance between the cylinders. Colloid mills with conical rotors can also be employed, and apparatus such as that disclosed in U. S. P. 2,351,492 is also useful.

In lieu of fine sand, comminuted aluminum oxide (Alundum) or similar hard, water-insoluble grinding powders may be employed.

The consistency of the mass being milled may be gaged by measuring the power input required by the mill. In the case of the disc mill, for instance, the ideal consistency is achieved when the net power input is from 0.4 to 1.5 kw. per square foot of disc area (both sides of the disc being considered).

Numerous other variations in detail will be readily apparent to those skilled in the art.

I claim as my invention:

1. A process of producing an aqueous paste of a phthalocyanine pigment in beta form and in pigmentary state, said phthalocyanine pigment being a member of the group consisting of copper phthalocyanine, nickel phthalocyanine, and metal-free phthalocyanine, which comprises forming a mixture of the crude pigment, a water-soluble, anionic dispersing agent, water, and a powdered water-insoluble grinding agent, the particles of the grinding agent being predominantly of a size between 100 and 325 mesh (U. S. sieve series), the crude pigment being essentially in beta form and in an initially fine state of subdivision, the quantity of grinding agent being not less than 2.5 parts by weight per part of pigment, and the quantity of water being sufficient to form a viscous, workable mass, subjecting the mixture to milling under conditions producing internal shear by setting up high velocity differentials between adjacent particles of the mass being milled, and recovering the pigment free of said grinding agent.

2. A process as in claim 1, the dispersing agent being a compound selected from the group consisting of the alkali-metal sulfonates of naphthalene-formaldehyde condensation products, the alkali-metal salts of lignin sulfonic acids, and the alkali-metal salts of hydrolized styrene-maleic-anhydride copolymers.

3. A process as in claim 1, the quantity of dispersing agent being from 10 to 100 parts by weight per 100 parts of the pigment.

4. A process as in claim 1, the recovery of the pigment being effected by diluting the milled mass with water, removing the water-insoluble grinding agent by a physical separation process, and recovering the resulting aqueous suspension of the pigment.

5. A process as in claim 4, wherein the aqueous suspension of the pigment obtained after removal of the grinding agent is concentrated to produce an aqueous pigment paste.

6. A process as in claim 4, wherein the aqueous suspension of the pigment obtained after removal of the grinding agent is evaporated to produce a dry pigment powder.

References Cited in the file of this patent

UNITED STATES PATENTS

| | | |
|---|---|---|
| 1,837,772 | Hailwood et al. | Dec. 22, 1931 |
| 2,213,693 | Davies et al. | Sept. 3, 1940 |
| 2,556,727 | Lane et al. | June 12, 1951 |
| 2,669,569 | Mutaffis | Feb. 16, 1954 |